UNITED STATES PATENT OFFICE.

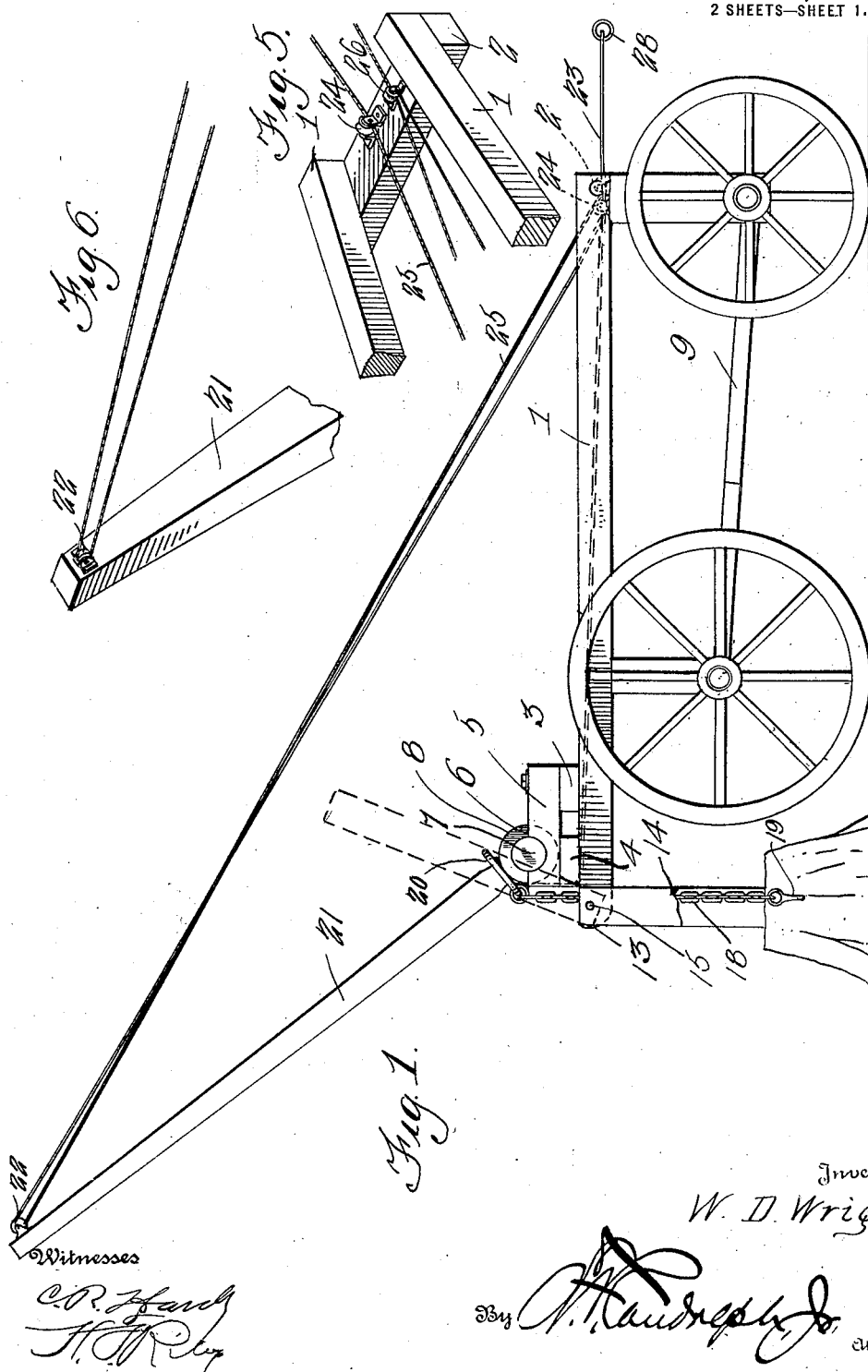

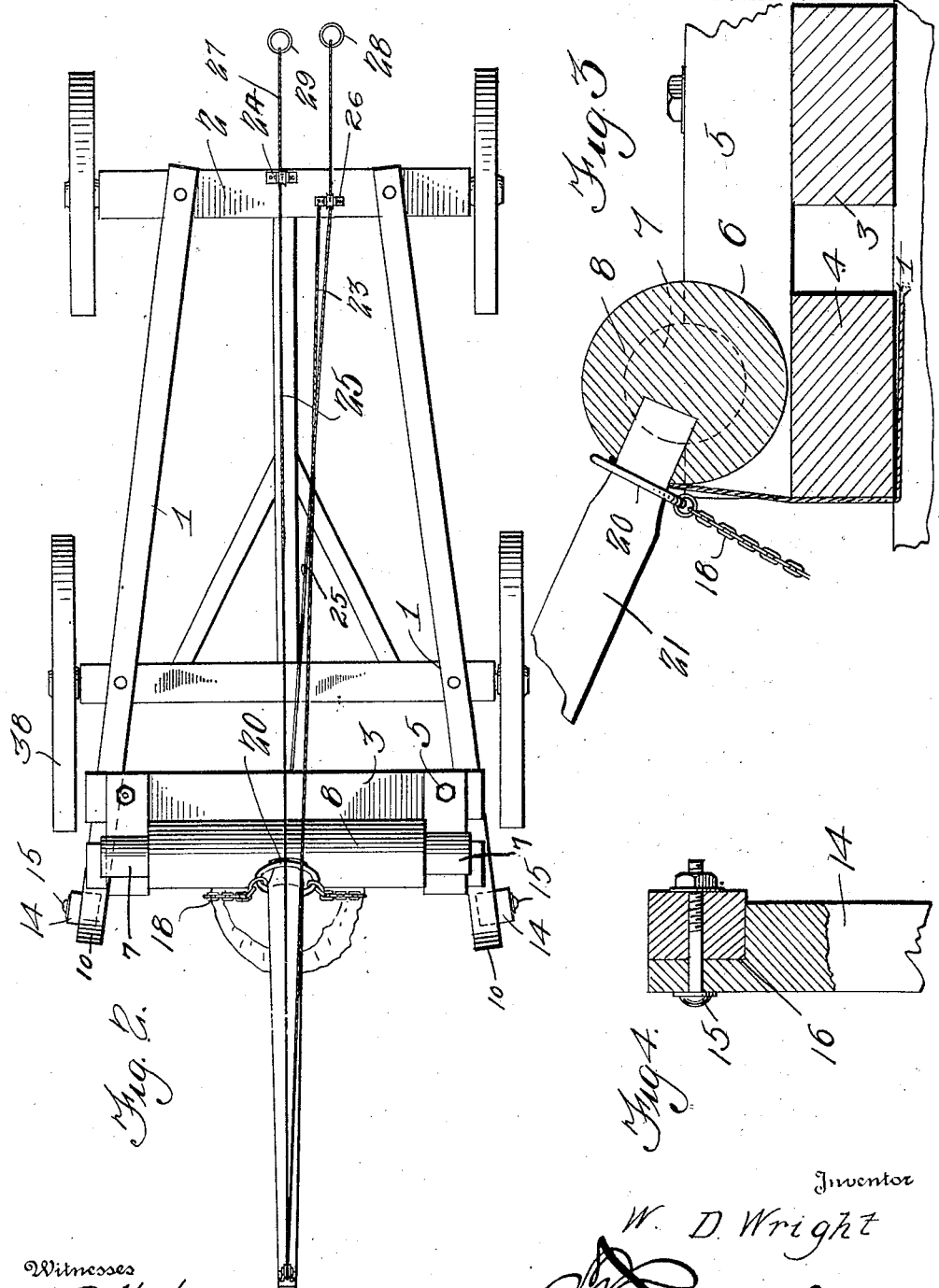

WALTER D. WRIGHT, OF STUART, OKLAHOMA.

STUMP-PULLER.

1,335,630.   Specification of Letters Patent.   Patented Mar. 30, 1920.

Application filed May 29, 1917. Serial No. 171,707.

*To all whom it may concern:*

Be it known that I, WALTER D. WRIGHT, a citizen of the United States, residing at Stuart, in the county of Hughes and State of Oklahoma, have invented certain new and useful Improvements in Stump-Pullers; and I do hereby declare the following to be a full, clear, and exact description of the invention, such as will enable others skilled in the art to which it appertains to make and use the same.

The invention relates to a stump puller.

The object of the present invention is to provide a simple, practical and efficient stump puller of strong, durable and inexpensive construction designed for use on a farm wagon or similar running gear and capable of enabling a stump to be extracted from the ground without excessive strain on the running gear, and adapted also to support the stump in an elevated position over the hole so that the soil may be removed from the stump and caused to fall into the hole.

A further object of the invention is to provide a stump puller of this character adapted also for handling stone, logs and other material and capable of enabling the same to be readily carried from one place to another.

It is also an object of the invention to provide a stump puller which will not have to be anchored and which will enable stumps to be pulled without the use of long and expensive cables.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a side elevation of a stump puller constructed in accordance with this invention.

Fig. 2 is a plan view of the same.

Fig. 3 is a longitudinal sectional view of the rear portion of the stump puller.

Fig. 4 is a detail sectional view of one of the pivoted legs.

Fig. 5 is a detail view of a portion of the front of the frame of the stump puller, and Fig. 6 is a detail view of a portion of a lever embodied in the invention.

Like numerals of reference designate corresponding parts in the several figures of the drawings.

In the accompanying drawings, in which is illustrated the preferred embodiment of the invention, the stump puller comprises in its construction a forwardly tapered frame composed of side beams or members 1 connected at their front ends by a transverse bar 2 and at their rear ends by cross bars 3 and 4. The bars 3 and 4 form supports for bearing blocks 5 having bearings 6 adapted for the reception of the reduced terminals or journals 7 of a roller 8. The frame of the stump puller is mounted on a farm wagon running gear 9, and the front cross bar 2 is designed to take the place of the body bolster or locking bolster. The frame is designed to extend beyond the rear end of the running gear approximately three or four feet to enable the rear portion of the frame to extend over a stump. The rear end portions 10 of the side beams have rounded ends 13 to permit legs 14, which are secured to the beams by pivot bolts 15, to swing upwardly. The legs 14 have upper portions provided with recesses 16 to form bottom shoulders for fitting beneath the rear terminals of the side beams or members of the supporting frame of the stump puller. The legs 14 are adapted to relieve the running gear of the strain incident to pulling a stump from the ground. The stump is adapted to be supported in an elevated position upon being extracted from the ground to permit the dirt to drop back into the hole. The stump may be conveyed to any desired point without changing the chains 18 or other means for connecting the roller with the stump. The chains 18, which are provided with hooks 19, are connected to a ring 20 arranged on a relatively long lever 21. The lever 21 is secured to the roller centrally thereof and it is adapted to be swung downwardly from an elevated position for rotating the roller and winding the chains thereon to pull a stump from the ground. The stump puller is also adapted for pulling and lifting stones and other heavy objects. After a stump has been pulled and it is desired to convey the same to a point of disposal, the legs 14 are swung upwardly over the frame. The lever 21 is provided with a pulley 22 at its forward end over which passes a rope or cable 23 secured at one end to the front cross bar and extending therefrom to the pulley 22 and back under a pulley 24 mounted on the said front cross bar 2. The lever after being swung upwardly is returned to its initial elevated position by means of a rope or cable 25 extending rearwardly through a guide 26. The rear portion of the rope or cable 25 is wound around the roller when the latter is in a horizontal or non-operative position and when the rope or cable 25 is pulled forwardly the lever will be swung upwardly. In extracting a stump, the stump puller is either run over the same or backed so as to straddle the stump and the chains are connected with the stump, the lever being operated by one or more draft animals as required. The stump will be extracted with a straight lift and it will be unnecessary to anchor the stump puller. The stump puller is easily constructed and may be readily repaired at an ordinary blacksmith shop, and besides being adapted for lifting and handling stones and logs, it may be employed in road work and the like. The ropes or cables are provided at their front ends with rings 28 and 29 for the attachment of a draft device of any character.

What is claimed is:

1. A stump puller including a running gear, a frame mounted on the running gear and extending rearwardly beyond the same, bearing blocks arranged on the rearwardly extended portion of the frame, a roller traversing the rearwardly extended portion of the frame and having reduced end portions arranged in said bearings, a lever secured to said roller, stump engaging elements secured to the lever and adapted to be wound about the roller upon the operation of the lever, means to operate the lever, and a cable wound about the roller and adapted when pulled to elevate the lever.

2. A stump puller comprising a running gear, a frame mounted upon the running gear and extending rearwardly from the same, a roller mounted on the rearwardly extended end portion of the running gear, a lever secured to said roller, stump engaging elements secured to the lever and adapted to be wound about the roller upon the operation of the lever, supporting legs pivotally secured to the rearwardly extended end portions of the frame, means to operate the lever, and a cable adapted to be wound about the roller, said cable extending longitudinally of the frame and adapted to elevate the lever.

In testimony whereof I affix my signature in presence of two witnesses.

WALTER D. WRIGHT.

Witnesses:
W. P. FORRESTER,
E. F. BURNETT.